(12) United States Patent
Tsunai

(10) Patent No.: US 6,515,318 B2
(45) Date of Patent: Feb. 4, 2003

(54) CHARGE TRANSFER DEVICE

(75) Inventor: Shiro Tsunai, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/942,143

(22) Filed: Aug. 29, 2001

(65) Prior Publication Data

US 2002/0024069 A1 Feb. 28, 2002

(30) Foreign Application Priority Data

Aug. 31, 2000 (JP) ........................................ 2000-263823

(51) Int. Cl.$^7$ ............................................ H01L 27/148
(52) U.S. Cl. ...................... 257/239; 257/238; 257/241; 257/214; 257/215
(58) Field of Search ................................ 257/239, 238, 257/241, 183.1, 214, 215

(56) References Cited

U.S. PATENT DOCUMENTS 6,130,556 A * 10/2000 Schmitt et al.
6,309,920 B1 * 10/2001 Laska et al.

FOREIGN PATENT DOCUMENTS

JP 2666522 6/1997 ......... H01L/29/762

* cited by examiner

Primary Examiner—Fetsum Abraham
(74) Attorney, Agent, or Firm—Hayes Soloway PC

(57) ABSTRACT

A charge transfer device is provided which is capable of reducing a reset field-through noise in a stable manner without being affected by characteristics of transistors and without occurrence of a mustache-shaped pulse-like noise. The charge transfer device is made up of a floating diffusion region used to convert a signal charge transferred from a CCD (Charge Coupled Device) into a voltage, resetting unit used to eject the signal charge accumulated in the floating diffusion region in response to a reset pulse, a first stage source follower used to current-amplify the voltage and second stage source follower in which load is changed in response to the reset pulse and which is used to current-amplify an output voltage of the first stage source follower.

34 Claims, 4 Drawing Sheets

41; delay circuit

51; delay circuit

61; voltage amplifier

CHARGE TRANSFER DEVICE

BACKGROUND OF THE INVENTION

1. Field of the Invention

The present invention relates to a charge transfer device and more particularly to the charge transfer device that can be suitably used in an image pickup apparatus such as a television camera or a like.

The present application claims priority of Japanese Patent Application No. 2000-275708 filed on Sep. 11,2000, which is hereby incorporated by reference.

2. Description of the Related Art

FIG. 7 is a schematic block diagram for showing configurations of a conventional charge transfer device disclosed in Japanese Patent No. 2666522. The disclosed charge transfer device includes a CCD (Charge Coupled Device) 1, a floating diffusion region 2, depletion type n-channel MOS (Metal Oxide Silicon) transistors 3 to 5 and enhancement type n-channel MOS transistors 6 to 8.

The floating diffusion region layer 2 is formed using a pn-junction islands-structured semiconductor region and is adapted to convert a signal charge (electron) injected into one terminal (charge injecting point P) of the floating diffusion region layer 2 after having been transferred through a charge transfer region (not shown) in the CCD 1 and after having passed a channel under an output gate (not shown), into a voltage. A capacitance of the floating diffusion region layer 2, in order to enhance a conversion rate at which the above signal charge is converted into the voltage, is ordinarily set at as small as about 7 fF (femto Farad). The MOS transistor 3 operates as a resetting unit to eject the signal charge accumulated in the floating diffusion region 2 and to reset a voltage $V_P$ at the charge injecting point P to a constant level, to a gate of which a reset pulse $\phi_R$ is fed and to a drain of which a reset drain voltage $V_{RD}$ is applied and a source of which is connected to the charge injecting point P.

The MOS transistors 4, 6, and 7 make up a first stage source follower 9 in which the MOS transistor 6 functions as a driving transistor, the MOS transistor 4 functions as a load transistor, and the MOS transistor 7 functions as the load transistor only when it is turned ON. An input terminal of the source follower 9, that is, to a gate of the MOS transistor 6, is connected to the charge injecting point P. A drain of the MOS transistor 6 is applied a supply voltage $V_{DD}$. A gate and source of the MOS transistor 4 and a source of the MOS transistor 7 are grounded and to a gate of the MOS transistor 7 is applied the reset pulse $\phi_R$.

The MOS transistors 5 and 8 make up a second stage source follower 10 in which the MOS transistor 8 functions as a driving transistor and the MOS transistor 5 functions as a load transistor. An input terminal of the source follower 10, that is, a gate of the MOS transistor 8 is connected to an output terminal of the source follower 9, that is, a connection point among the source of the MOS transistor 6, drain of the MOS transistor 4, and the drain of the MOS transistor 7. To a drain of the MOS transistor 8 a supply voltage $V_{DD}$ is applied. A gate and source of the MOS transistor 5 are grounded. From an output terminal of the source follower 10, that is, from a connection point between a source of the MOS transistor 8 and a drain of the MOS transistor 5 is an output voltage $V_{OUT}$.

Next, operations of the above charge transfer device will be described. The signal charge (electron) transferred through the charge transfer region and accumulated under a transfer electrode, after having passed through the channel under the gate, is injected into the charge injecting point P of the floating diffusion region 2. A voltage at the charge injecting point P that has changed by the injection of the signal charge into the charge injecting point P, after being amplified by each of the first stage and second stage source followers 9 and 10, is output as the output voltage $V_{OUT}$. The output voltage $V_{OUT}$ is further amplified about ten-fold and, after having been sample-held, is converted into digital data by an AD converter (not shown).

Then, when the reset pulse $\phi_R$ goes high, the MOS transistor 3 is turned ON and a source voltage of the MOS transistor 3, that is, a voltage $V_P$ at the charge injecting point P and the reset drain voltage $V_{RD}$ that has been applied to a drain of the MOS transistor 3 become the same. At this point, in the source follower 9, since the MOS transistor 7 is turned ON by the supply of the "high" reset pulse $\phi_R$ and the MOS transistors 4 and 7 forming the parallel circuit, function as the load transistors, more currents flow through the MOS transistors 4 and 7, compared with the case in which only the MOS transistor 4 functions as the load transistor, thus causing an offset current of the source follower 9 to be reduced.

Next, when the reset pulse $\phi_R$ goes low, the MOS transistor 3 is turned ON and a state at the charge injecting point P becomes floating. At this point, in the source follower 9, since the MOS transistor 7 is turned OFF by the supply of the "low" reset pulse $\phi_R$ and only the MOS transistor 4 functions as the load transistor, less current flows through the MOS transistor 4, compared with the case in which the MOS transistors 4 and 7 forming the parallel circuit, function as the load transistor, thus causing the offset voltage of the source follower 9 to be boosted.

FIG. 8A is a cross-sectional view of the floating diffusion region 2 and related components connected thereto to explain principles of occurrence of a reset field-through noise described later. FIG. 8B is a diagram showing potentials of the components making up the floating diffusion region 2. In some cases, as shown in FIG. 7 and FIGS. 8A and 8B, since a coupling capacitor $C_1$ exists between a gate 3a of the MOS transistor 3 and the charge injecting point P, electrons accumulated under the gate 3a are returned back to the floating diffusion region 2 through this coupling capacitor $C_1$. Moreover, the capacitance of the floating diffusion region 2, as described above, is ordinarily set at as low as 7 fF to enhance the conversion rate to convert the signal charge to the voltage and, structurally, its impedance is very high. Moreover, as shown in FIG. 7 and FIGS. 8A and 8B, a coupling capacitor $C_2$ exists between the gate and the source of the MOS transistor 6. As shown in FIG. 8A, an N-type well 12 is formed on a P-type well or P-type substrate 11 and a gate oxide film (not shown) and polycrystalline silicon film (not shown) are sequentially formed on a top surface of the N-type well 12 and, by performing patterning operations on them films, the CCD 1, floating diffusion region 2, and MOS transistor 3 are fabricated.

Due to the above three factors, the voltage $V_P$ at the charge injecting point P is changed in synchronization with switching operations of the MOS transistor 3 caused by the supply of the reset pulse $\phi_R$, A noise induced by this change in the voltage is called the "reset field-through noise". Though this reset field-through noise is superimposed on the output voltage $V_{OUT}$, as described above, since only when the reset pulse $\phi_R$ goes high, the MOS transistor 7 functions as the load transistor and the offset voltage of the source follower 9 is lowered, the reset field-through noise superimposed on the output voltage $V_{OUT}$, since it is reduced by the MOS transistor 7, becomes small, compared with the reset field-through noise being produced in the voltage $V_P$ at the charge injecting point P.

In the conventional charge transfer device as described above, as the MOS transistor 5 making up the second stage source follower 10, the depletion type MOS transistor is used. Since such the depletion type MOS transistor has the property that the current to be controlled does not flow at an interface surface of the gate oxide film thereof but flows at a deeper portion, the current control is structurally difficult and the fabrication of the charge transfer device that can provide constant operating points is difficult accordingly. Therefore, the conventional charge transfer device presents a problem in that an amount of the reset field-through noise to be reduced varies in each of the fabricated charge transfer devices.

Moreover, in the conventional charge transfer device, the depletion type MOS transistor and enhancement type MOS transistor with configurations differing from each other are used as the MOS transistors 4 and 7 functioning as the load transistor in the first stage source follower 9. Therefore, also in this case, the amount of the reset field-through noise to be reduced varies in each of the fabricated charge transfer devices due to variations in threshold values or in gate widths of each of the MOS transistors 4 and 7. This presents another problem.

Furthermore, in the conventional charge transfer device, since the reset pulse $\phi_R$ is applied to the MOS transistor functioning as the load transistor in the first stage source follower 9, the output voltage from the source follower 9 is changed and this change affects the floating diffusion region 2 through the coupling capacitor $C_2$. This causes a mustache-shaped pulse-like noise to be produced in the signal having the output voltage $V_{OUT}$ at a change point of the reset pulse $\phi_R$; thus presenting still another problem.

SUMMARY OF THE INVENTION

In view of the above, it is an object of the present invention to provide a charge transfer device capable of reducing a reset field-through noise in a stable manner without being affected by characteristics of transistors and without occurrence of a mustache-shaped pulse-like noise.

According to a first aspect of the present invention, there is provided a charge transfer device including:

a floating diffusion region to convert a signal charge transferred from a charge coupled device into a voltage;

a resetting unit to eject a signal charge accumulated in the floating diffusion region in response to a reset pulse;

a first source follower to current-amplify the voltage; and a second source follower in which a load is changed in response to the reset pulse and which is used to current-amplify an output voltage of the first source follower.

In the foregoing, a preferable mode is one that wherein includes a voltage amplifier to voltage-amplify the output voltage of the first follower and to feed the amplified voltage to the second source follower.

Also, a preferable mode is one that wherein includes a delay circuit to delay the reset pulse by a fixed time interval and to feed the reset pulse to the second source follower.

Also, a preferable mode is one wherein the delay circuit is made up of a resistor and a capacitor.

Also, a preferable mode is one wherein the delay circuit is made up of inverters connected in series in a plurality of stages.

Also, a preferable mode is one wherein delay time set by the delay circuit is determined based on delay time in the first source follower and on delay time in the resetting unit.

Also, a preferable mode is one wherein the delay time set by the delay circuit is determined based on delay time in the first source follower, delay time in the resetting unit, and delay time in the voltage amplifier.

Also, a preferable mode is one wherein the second source follower is made up of a driving transistor, first load transistor, and second load transistor which function only when the reset pulse or delayed reset pulse is applied.

Also, a preferable mode is one wherein the second load transistor is an enhancement type n-channel MOS transistor doped with p-type impurity.

Also, a preferable mode is one wherein the first and second load transistors are enhancement type n-channel MOS transistors doped with p-type impurity wherein the first and second load transistors have same gate widths and operate at same threshold voltages and wherein a supply voltage is applied to a gate of the first load transistor and the reset pulse or the delayed reset pulse having approximately a same amplitude as that of the supply voltage is applied to a gate of the second load transistor.

Furthermore, a preferable mode is one wherein a gate width of the second load transistor is designed so that a reset field-through noise occurring based on operations of the resetting unit is reduced to a predetermined amount.

According to a second aspect of the present invention, there is provided a charge transfer device including:

a floating diffusion region to convert a signal charge transferred from a charge coupled device into a voltage;

a resetting unit to eject a signal charge accumulated in the floating diffusion region in response to a reset pulse;

a first source follower to current-amplify the voltage;

a second source follower in which a load is changed in response to the reset pulse and which is used to current-amplify an output voltage of the first source follower;

a voltage amplifier to voltage-amplify the output voltage of the first follower and to feed the amplified voltage to the second source follower; and a delay circuit to delay the reset pulse by a fixed time interval and to feed the reset pulse to the second source follower.

With the above configurations, since the charge transfer device of the present invention is provided with the floating diffusion region used to convert the signal charge transferred from the CCD into the voltage, the resetting unit used to eject the signal charge accumulated in the floating diffusion region in response to the reset pulse, the first stage source follower used to current-amplify the voltage and the second stage source follower in which the load is changed in response to the reset pulse and which is used to current-amplify the output voltage of the first stage source follower, the reset field-through noise can be reduced in a stable manner without being affected by changes in characteristics of the transistors and without the occurrence of the mustache-shaped pulse-like noise.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
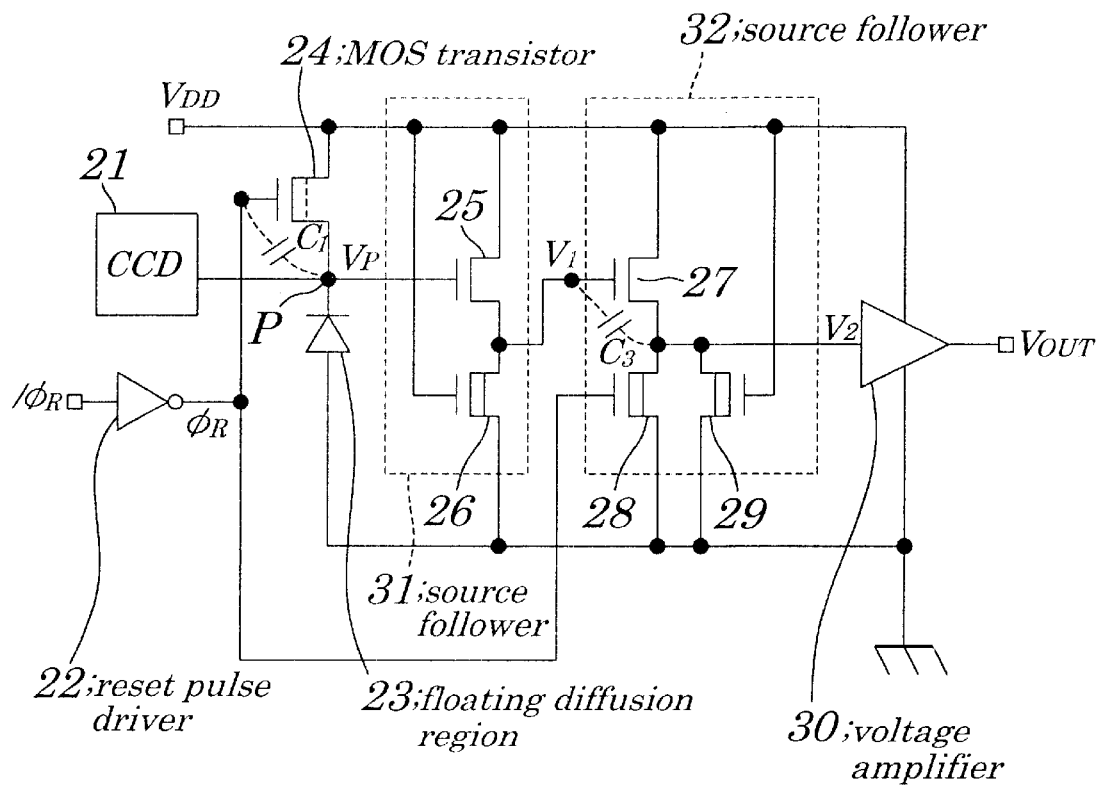
FIG. 1 is a schematic circuit diagram showing configurations of a charge transfer device according to a first embodiment of the present invention.

FIG. 1 is a schematic circuit diagram for showing configurations of a charge transfer device according to a first embodiment of the present invention. The charge transfer device of the first embodiment includes a CCD 21, a reset pulse driver 22, a floating diffusion region 23, a depletion type n-channel MOS transistor 24, an enhancement type n-channel MOS transistor 25, enhancement type n-channel MOS transistors doped with p-type impurity 26 to 29 and a voltage amplifier 30. The reset pulse driver 22 reverses a "low-active" reset pulse/$\phi_R$ fed from the outside and outputs the reversed pulse as a "high-active" reset pulse $\phi_R$ having an output amplitude being almost the same as that of a supply voltage $V_{DD}$. The floating diffusion region 23 is formed using a pn-junction islands-structured semiconductor region and is adapted to convert a signal charge (electron) injected into one terminal (charge injecting point P) of the floating diffusion region 23 after having been transferred through a charge transfer region (not shown) in the CCD 21 and after having passed a channel under an output gate (not shown), into a voltage. A capacitance of the floating diffusion region 23, in order to enhance a conversion rate at which the above signal charge is converted into the voltage, is ordinarily set at as small as about 7 fF. The MOS transistor 24 operates as a resetting unit to eject the signal charge accumulated in the floating diffusion region 23 and to reset a voltage $V_P$ at the charge injecting point P to a constant level, to a gate of which a reset pulse $\phi_R$ is fed, to a drain of which the supply voltage $V_{DD}$ is applied, and a source of which is connected to the charge injecting point P.

The MOS transistors 25 and 26 make up a first stage source follower 31 in which the MOS transistor 25 functions as a driving transistor and the MOS transistor 26 functions as a load transistor. An input terminal of the source follower 31, that is, a gate of the MOS transistor 25 is connected to the charge injecting point P and the supply voltage $V_{DD}$ is applied to a drain of the MOS transistor 25 and to a gate of the MOS transistor 26, and a source of the MOS transistor 26 is grounded.

The MOS transistors 27 to 29 make up a second source follower 32 in which the MOS transistor 27 functions as a driving transistor and the MOS transistor 29 functions as a load transistor, and the MOS transistor 28, only when it is turned ON, functions as the load transistor. An input terminal of the source follower 32, that is, a gate of the MOS transistor 27 is connected to an output terminal of the source follower 31, that is, to a connection point between a source of the MOS transistor 25 and a drain of the MOS transistor 29. To a drain of the MOS transistor 27 and to a gate of the MOS transistor 29 is applied the supply voltage $V_{DD}$. A source of the MOS transistor 28 and a source of the MOS transistor 29 are grounded. To a gate of the MOS transistor 28 is applied the reset pulse $\phi_R$. Configurations (including set gate widths and threshold voltages) of the MOS transistors 28 and 29 are the same. An input terminal of the voltage amplifier 30 is connected to an output terminal of the source follower 32, that is, to a connection point among a source of the MOS transistor 27, drain of the MOS transistor 28, and drain of the MOS transistor 29. The voltage amplifier 30, after having voltage-amplified a signal which had been current-amplified by the source follower 32, outputs the amplified voltage as an output voltage $V_{OUT}$.

Next, operations of the charge transfer device having configurations described above will be explained. The signal charge (electron) transferred in the charge transfer region and accumulated under a transfer electrode in the CCD 21, after having passed a channel under the output gate, is injected into the charge injecting point P of the floating diffusion region 23. A voltage at the charge injecting point P that has changed by the injection of the signal charge into the charge injecting point P, after being current-amplified by each of the first stage and second stage source followers 31 and 32, is voltage-amplified about ten-fold by the voltage amplifier 30 and is then output as the output voltage $V_{OUT}$. The output voltage $V_{OUT}$, after being sample-held, is converted into digital data by an AD converter (not shown).

Next, when the reset pulse/$\phi_R$ supplied from the outside becomes low and the reset pulse driver 22 reverses the "low" reset pulse/$\phi_R$ and then feeds the "high" reset pulse $\phi_R$ to the MOS transistor 24, the MOS transistor 24 is turned ON and a source voltage of the MOS transistor 24, that is, the voltage $V_P$ at the charge injecting point P becomes equal to the supply voltage $V_{DD}$ which has been applied to the drain of the MOS transistor 24, as a result, causing the signal charge (electron) supplied to the charge injecting point P of the floating diffusion region 23 to be ejected through a terminal of the supply voltage $V_{DD}$.

At this point, in the source follower 32, since the "high" reset pulse $\phi_R$ has been supplied from the reset pulse driver 22, the MOS transistor 28 is turned ON, causing the MOS transistors 28 and 29 forming parallel circuits, to act as the load transistors. Therefore, more currents flow through the MOS transistors 28 and 29, compared with a case in which only the MOS transistor 29 functions as the load transistor and, as a result, the offset voltage of the source follower 32 is lowered.

Next, when the reset pulse/$\phi_R$ supplied from the outside goes high and the reset pulse driver 22 reverses the "high" reset pulse/$\phi_R$ and the feeds the "low" reset pulse $\phi_R$ to the MOS transistor 24, the MOS transistor 24 is turned OFF and a state at the charge injecting point P becomes floating. At this point, in the source follower 32, since the "low" reset pulse $\phi_R$ has been supplied from the reset pulse driver 22, the MOS transistor 28 is turned OFF and, as a result, only the MOS transistor 29 functions as the load transistor. Therefore, compared with the case in which the MOS transistors 28 and 29 forming the parallel circuit, functions as the load transistor, less currents flow through the MOS transistor 29, thus causing the offset voltage of the source follower 32 to rise.

As shown in FIG. 1, a coupling capacitor $C_1$ exists between the gate of the MOS transistor 24 and the charge injecting point P. In some cases, electrons accumulated under the gate return back to the floating diffusion region 23 through the coupling capacitor $C_1$. A capacitance of the floating diffusion region 23, in order to enhance a conversion rate at which the above signal charge is converted into the voltage, is ordinarily set at as small as about 7 fF and, structurally, its impedance is very high.

Because of the above two reasons, in synchronization with the switching operations of the MOS transistor 24 caused by the reset pulse $\phi_R$, the voltage $V_P$ varies, which causes a reset field-through noise.

The reset field-through noise is superimposed on the output of the first stage source follower 31, that is, on an input voltage $V_1$ of the second stage source follower 32. However, according to the embodiment, owing to reasons described below, the reset field-through noise can be reduced in a stable manner without being affected by characteristics of the MOS transistors and without the occurrence of the mustache-shaped pulse-like noise.

Figure 2:
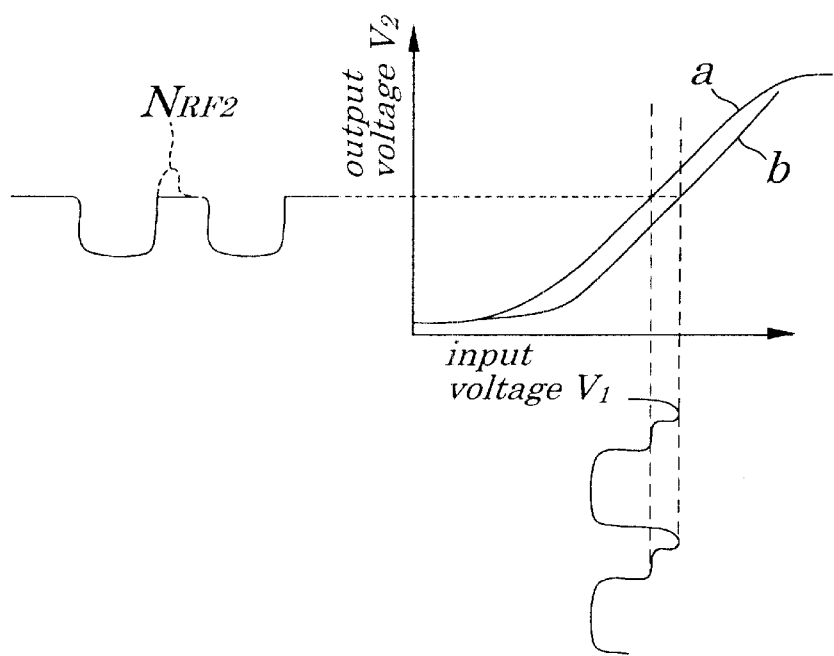
FIG. 2 is a diagram showing one example of characteristics of an input voltage and an output voltage in a source follower making up the charge transfer device according to the first embodiment of the present invention.

As described above, since, only when the reset pulse $\phi_R$ goes high, the MOS transistor 28 functions as the load transistor, causing the offset voltage of the second stage source follower 32 to be lowered, the reset field-through noise $N_{RF2}$ (FIG. 2) superimposed on an output voltage $V_2$ is smaller than that produced in the voltage $V_P$, at the charge injecting point P. In this case, since, when the reset pulse $\phi_R$ goes high, an amount of current flowing through the MOS transistor 28 can be changed by changing a gate width of the MOS transistor 28, as shown in FIG. 2, if only the gate width of the MOS transistor 28 is optimally designed, it is possible to arbitrarily adjust the amount of the reset field-through noise $N_{RF2}$ that can be reduced. FIG. 2 is a diagram showing one example of characteristics of the input voltage $V_1$ and output voltage $V_2$ in the source follower 32 making up the charge transfer device of the first embodiment. In FIG. 2, the curves "a" and "b" show characteristics of the input voltage $V_1$ of the source follower 32, that is, the voltage applied to the gate of the MOS transistor 27 and the output voltage $V_2$, that is, the voltage output from the drains of the MOS transistors 28 and 29, produced when the gate width of the MOS transistor 28 is changed.

Next, according to the embodiment, as the MOS transistor 29 making up the second stage source follower 32, the enhancement type n-channel MOS transistor doped with the p-type impurity is used. Since the enhancement type MOS transistor has a property that the current to be controlled flows at an interface surface of the gate oxide film of the MOS transistor, it is easy, structurally, to control the current and to fabricate the charge transfer device so as to provide constant operating points. Therefore, unlike in the case of the conventional charge transfer device, there are no variations in the amount of the reset field-through noise that can be reduced in each of the fabricated charge transfer devices.

Moreover, in the embodiment, both the MOS transistors 28 and 29 which function as the load transistor for the second stage source follower 32 have the same configuration (including their set gate width and threshold voltages). To the gate of the MOS transistor 28 is fed the reset pulse $\phi_R$ having the same output amplitude as that of the supply voltage $V_{DD}$ from the reset pulse driver 22. To the gate of the MOS transistor 29 is applied the supply voltage $V_{DD}$. Therefore, unlike in the case of the conventional charge transfer device, even when variations in the characteristics of the charge transfer device occur, there are no variations in the amount of the reset field-through noise that can be reduced in each of the fabricated charge transfer devices. The reasons for that are explained below. To the drain of the MOS transistor 24, to the gate of which the reset pulse $\phi_R$ is applied, is applied the supply voltage $V_{DD}$ and the amplitude of the reset field-through noise is generally proportional to the amplitude of the reset pulse $\phi_R$. If, therefore, the amplitude of the reset pulse $\phi_R$ to be applied to the gate of the MOS transistor 28 is made larger, larger amounts of current flows through the MOS transistor 28 and therefore the reset field-through noise is reduced more. That is, by changing the amount (amplitude) of the reset field-through noise and the amount of the reset field-through noise to be reduced in a direction opposite to each other by supplying the same supply voltage, the reset field-through noise can be reduced in a stable manner.

Moreover, when the voltages applied to the gate of each of the MOS transistors 28 and 29 forming the parallel circuit are at a same level, the amount of the reset field-through noise to be reduced can be made constant. Moreover, if the supply voltage $V_{DD}$ is 12 V, since the amplitude of the reset pulse $\phi_R$ is almost the same as that of the supply voltage $V_{DD}$, in order to put the MOS transistor 28 completely in an OFF state when the reset pulse $\phi_R$ is low, that is, when the voltage of the reset pulse $\phi_R$ is 0 (zero) V, it is preferable that the threshold voltage of the MOS transistors 28 and 29 is 1.0 V or more.

Figure 7:
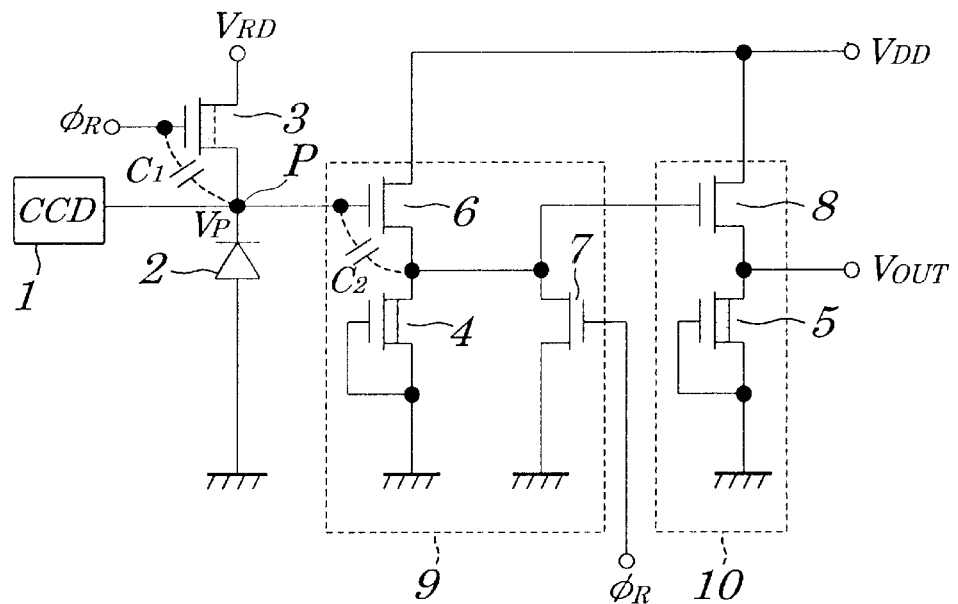
FIG. 7 is a schematic block diagram showing configurations of a conventional charge transfer device.
Figure 8A:
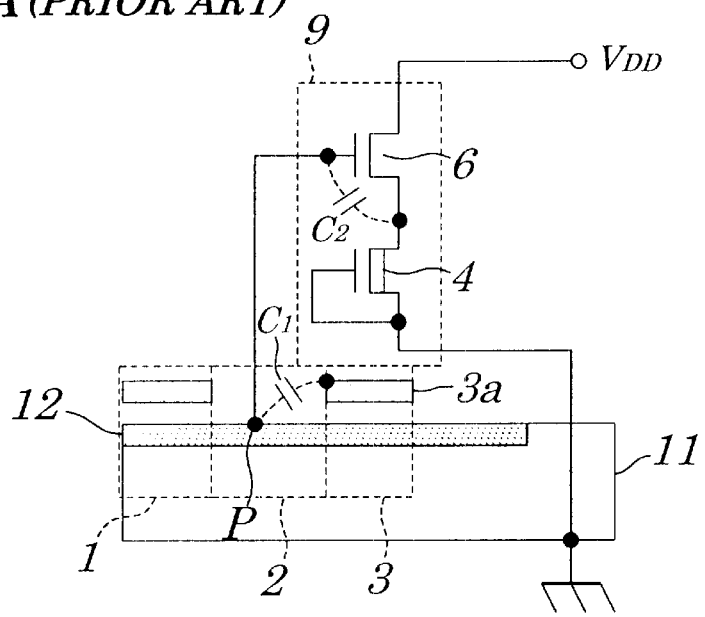
FIG. 8A is a cross-sectional view of a floating diffusion region and related components connected to the floating diffusion region explaining principles of occurrence of a reset field through noise and FIG. 8B is a diagram showing potentials of components making up the floating diffusion region in the conventional charge transfer device.
Figure 8B:
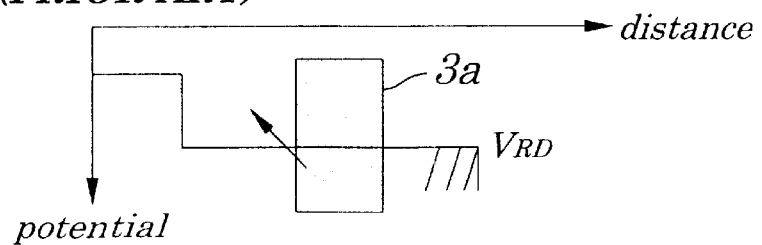

Also, in the embodiment, since the reset pulse $\phi_R$ is applied to the MOS transistor functioning as the load transistor in the second source follower 32, the output voltage of the second stage source follower 32 is changed and this change affects the output voltage $V_1$ of the first stage source follower 31 through a coupling capacitor $C_3$ to cause the mustache-shaped pulse-like noise to be produced in the output voltage at a change point of the reset pulse $\phi_R$. However, owing to low output impedance of the first stage source follower 31, the mustache-shaped pulse-like noise has little effect on the voltage and, if the supply voltage $V_{DD}$ is 12 V, an amount to be affected is 7 mV in amplitude. Therefore, even when the output voltage $V_2$ of the second stage source follower 32 is voltage-amplified using the voltage amplifier 30 of its amplification factor of eight times and of a type handling a frequency of 10 MHz or more that enables a high-speed data transfer, the amplitude of the mustache-shaped pulse-like noise produced in the output voltage $V_{OUT}$ can be reduced to about 50 mV. In contrast, if the conventional charge transfer device is operated under such the conditions as applied in the above embodiment, an amplitude of the mustache-shaped pulse-like noise occurring in a source follower 9 shown in FIG. 7 is as large as about 200 mV. If the output voltage of the latter follower 10 (FIG. 7) is voltage-amplified using the voltage amplifier of its amplification factor of eight times, the amplitude of the mustache-shaped pulse-like noise produced in the output voltage $V_{OUT}$ is as high as 700 mV, though the band is limited, which is not negligible when a maximum output amplitude of the voltage amplifier is 2 V. Moreover, if the voltage amplifier of a high-speed type is used for the amplification, the amplitude of the mustache-shaped pulse-like noise is as large as 1.2 V.

Second Embodiment

Figure 3:
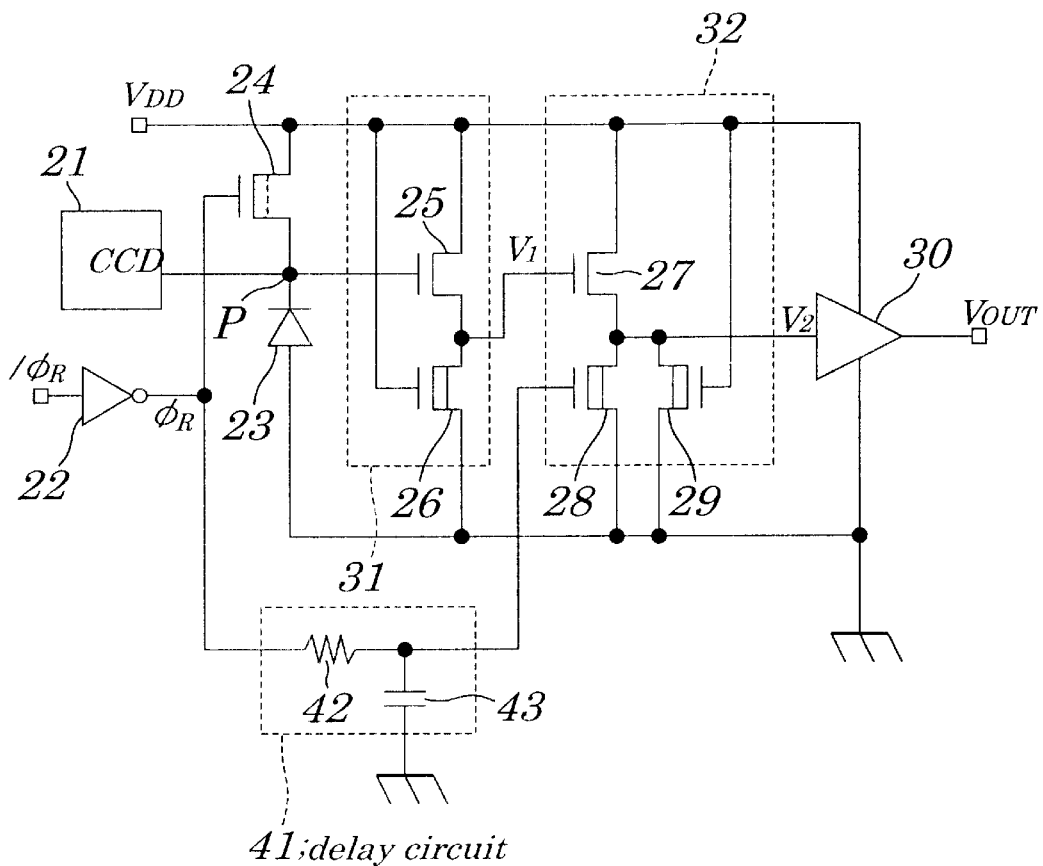
FIG. 3 is a schematic circuit diagram showing configurations of a charge transfer device according to a second embodiment of the present invention.

FIG. 3 is a schematic circuit diagram for showing configurations of a charge transfer device according to a second embodiment of the present invention. In FIG. 3, same reference numbers are assigned to each of parts corresponding to those in FIG. 1 and their descriptions are omitted accordingly. In the charge transfer device of the second embodiment, as shown in FIG. 3, a delay circuit 41 is provided between an output terminal of a reset pulse driver 22 and the gate of a MOS transistor 28.

The delay circuit 41 includes a resistor 42 one terminal of which is connected to the output terminal of the reset pulse driver 22 and the other terminal of which is connected to the gate of the MOS transistor 28 and a capacitor 43 one terminal of which is connected to the other terminal of the resistor 42 and the other terminal of which is grounded. Delay time set by the delay circuit 41 is determined by performing a simulation with consideration given to delay time in the first stage source follower 31 and delay time in a MOS transistor 24. Preferably, the delay time is set at 5 nsec to 10 nsec in ordinary cases.

Operations of components, except the delay circuit 41, in the charge transfer device having the above configurations are the same as those of corresponding components in the first embodiment and their descriptions will be omitted accordingly.

Figure 4:
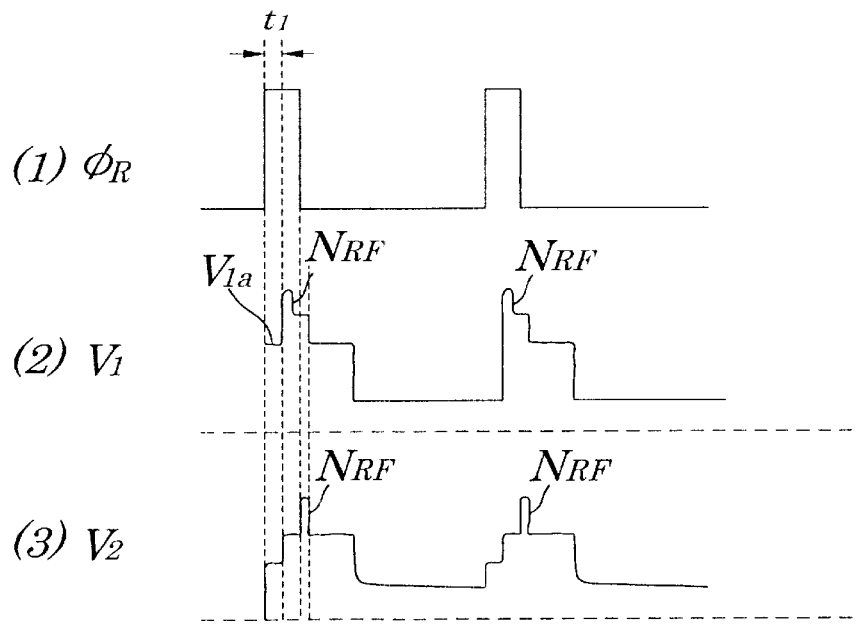
FIG. 4 is a timing chart explaining operations of the charge transfer device according to the second embodiment of the present invention.

FIG. 4 is a timing chart explaining operations of the charge transfer device according to the second embodiment of the present invention. If the delay time in the first stage source follower 31 is "$t_1$", outputting of the output voltage $V_1$ of the first stage source follower 31 is, as shown in FIG. 4(2), delayed by the delay time "$t_1$" relative to a reset pulse $\phi_R$. However, in the first embodiment, since the reset pulse $\phi_R$, to reduce reset field-through noise $N_{RF}$, is applied, as it is, to the gate of the MOS transistor 28 making up a second stage source follower 32 (see FIG. 4(1)). Therefore, in the second stage source follower 32, the MOS transistor 28 is turned ON by the reset pulse $\phi_R$ that has not been delayed at all and the noise reduction processing is performed on a voltage $V_{1a}$ that is a part of the output voltage $V_1$ on which the reset field-through noise $N_{RF}$ has not been superimposed originally, which not only causes waveforms of an output voltage $V_2$ to be perturbed but also causes the reset field-through noise $N_{RF}$ to be reduced to be left, without being reduced.

In contrast, according to the second embodiment, since the delay time set by the delay circuit 41 is determined with consideration given to the delay time in the first stage source follower 31 and to the delay time in the MOS transistor 24 and the reset pulse $\phi_R$ is applied, with a delay set by the delay circuit 41, to the gate of the MOS transistor 28 making up the second stage source follower 32, no fluctuation in the output voltage $V_2$ occurs and reliable reduction of the reset field-through noise $N_{RF}$ is made possible.

Third Embodiment

Figure 5:
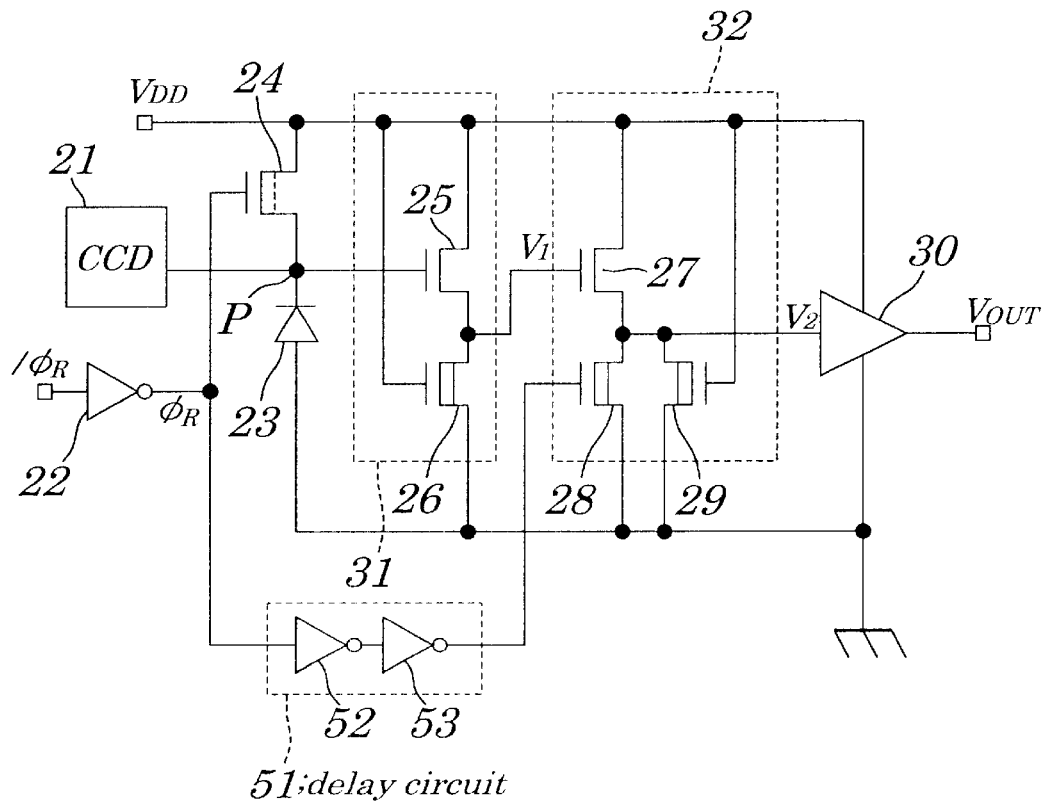
FIG. 5 is a schematic circuit diagram for showing configurations of a charge transfer device according to a third embodiment of the present invention.

FIG. 5 is a schematic circuit diagram for showing configurations of a charge transfer device according to a third embodiment of the present invention. In FIG. 5, same reference numbers are assigned to each of parts corresponding to those in FIG. 3 and their descriptions are omitted accordingly. In the charge transfer device of the third embodiment, instead of a delay circuit 41 shown in FIG. 3, a delay circuit 51 is newly provided.

The delay circuit 51 is made up of inverters 52 and 53 connected in series in which an input terminal of the inverter 52 is connected to an output terminal of a reset pulse driver 22 and an output terminal of the inverter 53 is connected to the gate of a MOS transistor 28. As in a case of a delay circuit of the second embodiment, delay time set by the delay circuit 51 is determined by performing a simulation with consideration given to delay time in a first stage source follower 31 and delay time in a MOS transistor 24. Preferably, the delay time is set at 5nsec to 10 nsec in ordinary cases.

Operations of components, except the delay circuit 51, in the charge transfer device having the above configurations are the same as those of corresponding components in the first embodiment and their descriptions will be omitted accordingly.

Thus, according to the charge transfer device of the third embodiment, the same effects obtained in the second embodiment can be achieved.

Fourth Embodiment

Figure 6:
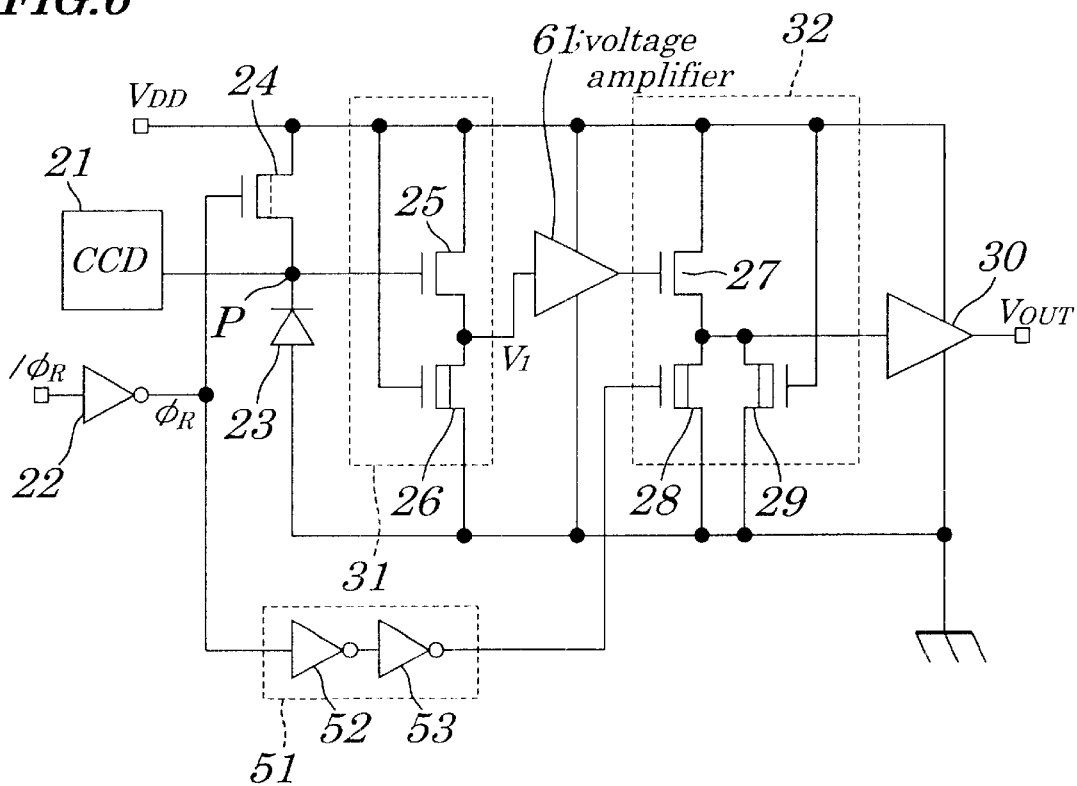
FIG. 6 is a schematic circuit diagram for showing configurations of a charge transfer device according to a fourth embodiment of the present invention.

FIG. 6 is a schematic circuit diagram for showing configurations of a charge transfer device according to a fourth embodiment of the present invention. In FIG. 6, same reference numbers are assigned to parts corresponding to those in FIG. 5 and their descriptions are omitted accordingly. In the charge transfer device of the fourth embodiment, a voltage amplifier 61 having approximately same functions as a voltage amplifier 30 is mounted between an output terminal of a first stage source follower 31 and an input terminal of a second stage source follower 32. Moreover, delay time set by a delay circuit 51 maybe determined by performing a simulation with consideration given to the delay time in the first stage source follower 31 and delay time in a MOS transistor 24. However, preferably, the delay time set by the delay circuit 51 is determined by performing the simulation with consideration given to delay time in the voltage amplifier 61, in addition to the delay time in the first stage source follower 31 and the delay time in the MOS transistor 24.

Operations of the charge transfer device of the embodiment are the same as those in the first embodiment except that, after the voltage amplifier 61 has voltage-amplified an output voltage $V_1$ of the first stage source follower 31, the second stage source follower 32 is adapted to current-amplify the output voltage of the voltage amplifier 61, and their descriptions are omitted accordingly.

Thus, in the fourth embodiment, since the output voltage of the first stage source follower 31 has been voltage-amplified by the voltage amplifier 61 and since the amplitude itself of a reset field-through noise $N_{RF}$ superimposed on the output voltage $V_1$ of the first stage source follower 31 is limited in the voltage amplifier 61, the amount of the reset field-through noise $N_{RF}$ to be reduced can be easily controlled.

It is apparent that the present invention is not limited to the above embodiments but may be changed and modified without departing from the scope and spirit of the invention. For example, in the third and fourth embodiments, the delay circuit 51 is made up of the two stage inverters 52 and 53, however, the present invention is not limited to this, that is, the number of the stages of the inverter may be arbitrary.

Moreover, in the fourth embodiment, the delay circuit 51 is employed as the delay circuit, however, a delay circuit 41 shown in FIG. 3 may be also used and if wiring delay is approximately the same as the delay time set by the delay circuit, the delay circuit may not need be mounted.

What is claimed is:

1. A charge transfer device comprising:
   a floating diffusion region to convert a signal charge transferred from a charge coupled device into a voltage;
   a resetting unit to eject a signal charge accumulated in said floating diffusion region in response to a reset pulse;
   a first source follower to current-amplify said voltage; and
   a second source follower in which a load is changed in response to said reset pulse and which is used to current-amplify an output voltage of said first source follower.

2. The charge transfer device according to claim 1, further comprising a voltage amplifier to voltage-amplify said output voltage of said first follower and to feed said amplified voltage to said second source follower.

3. The charge transfer device according to claim 1, further comprising a delay circuit to delay said reset pulse by a fixed time interval and to feed said reset pulse to said second source follower.

4. The charge transfer device according to claim 3, wherein said delay circuit is made up of a resistor and a capacitor.

5. The charge transfer device according to claim 3, wherein said delay circuit is made up of inverters connected in series in a plurality of stages.

6. The charge transfer device according to claim 3, wherein delay time set by said delay circuit is determined based on delay time in said first source follower and on delay time in said resetting unit.

7. The charge transfer device according to claim 3, wherein said delay time set by said delay circuit is determined based on delay time in said first source follower, delay time in said resetting unit, and delay time in said voltage amplifier.

8. The charge transfer device according to claim 1, wherein said second source follower is made up of a driving transistor, first load transistor, and second load transistor which function only when said reset pulse or delayed reset pulse is applied.

9. The charge transfer device according to claim 8, wherein said second load transistor is an enhancement type n-channel Metal Oxide Silicon transistor doped with p-type impurity.

10. The charge transfer device according to claim 8, wherein a gate width of said second load transistor is designed so that a reset field-through noise occurring based on operations of said resetting unit is reduced to a predetermined amount.

11. A charge transfer device comprising:
    a floating diffusion region to convert a signal charge transferred from a charge coupled device into a voltage;
    a resetting unit to eject a signal charge accumulated in said floating diffusion region in response to a reset pulse;
    a first source follower to current-amplify said voltage;
    a second source follower in which a load is changed in response to said reset pulse and which is used to current-amplify an output voltage of said first source follower;
    a voltage amplifier to voltage-amplify said output voltage of said first follower and to feed said amplified voltage to said second source follower; and
    a delay circuit to delay said reset pulse by a fixed time interval and to feed said reset pulse to said second source follower.

12. The charge transfer device according to claim 11, wherein said delay circuit is made up of a resistor and a capacitor.

13. The charge transfer device according to claim 11, wherein said delay circuit is made up of inverters connected in series in a plurality of stages.

14. The charge transfer device according to claim 11, wherein delay time set by said delay circuit is determined based on delay time in said first source follower and on delay time in said resetting unit.

15. The charge transfer device according to claim 11, wherein said delay time set by said delay circuit is determined based on delay time in said first source follower, delay time in said resetting unit, and delay time in said voltage amplifier.

16. The charge transfer device according to claim 11, wherein said second source follower is made up of a driving transistor, first load transistor, and second load transistor which function only when said reset pulse or delayed reset pulse is applied.

17. The charge transfer device according to claim 16, wherein said second load transistor is an enhancement type n-channel Metal Oxide Silicon transistor doped with p-type impurity.

18. The charge transfer device according to claim 16, wherein a gate width of said second load transistor is designed so that a reset field-through noise occurring based on operations of said resetting unit is reduced to a predetermined amount.

19. A charge transfer device comprising:
    a floating diffusion region to convert a signal charge transferred from a charge coupled device into a voltage;
    a resetting unit to eject a signal charge accumulated in said floating diffusion region in response to a reset pulse;
    a first source follower to current-amplify said voltage;
    a second source follower in which a load is changed in response to said reset pulse and which is used to current-amplify an output voltage of sad first source follower;
    said second source follower is made up of a driving transistor, first load transistor, and second load transistor which function only when said reset pulse or delayer reset pulse is applied; and
    wherein,said first and second load transistors are enhancement type n-channel Metal Oxide Silicon transistors doped with p-type impurity wherein said first and second load transistors have same gate widths and operate at same threshold voltages and wherein a supply voltage is applied to a gate of said first load transistor and said reset pulse or said delayed reset pulse having approximately a same amplitude as that of said supply voltage is applied to a gate of said second load transistor.

20. The charge transfer device according to claim 19, further comprising a voltage amplifier to voltage-amplify said output voltage of said first follower and to feed said amplified voltage to said second source follower.

21. The charge transfer device according to claim 19, further comprising a delay circuit to delay said reset pulse by a fixed time interval and to feed said reset pulse to said second source follower.

22. The charge transfer device according to claim 21, wherein said delay circuit is made up of a resistor and a capacitor.

23. The charge transfer device according to claim 21, wherein said delay circuit is made up of inverters connected in series in a plurality of stages.

24. The charge transfer device according to claim 21, wherein delay time set by said delay circuit is determined based on delay time in said first source follower and on delay time in said resetting unit.

25. The charge transfer device according to claim 21, wherein said delay time set by said delay circuit is determined based or delay time in said first source follower, delay time in said resetting unit, and delay time in said voltage amplifier.

26. The charge transfer device according to claim 19, wherein said second load transistor is an enhancement type n-channel Metal Oxide Silicon transistor doped with p-type impurity.

27. The charge transfer device according to claim 19, wherein a gate width of said second load transistor is designed so that a reset field-through noise occurring based on operations of said resetting unit is reduced to a predetermined amount.

28. A charge transfer device comprising:
- a floating diffusion region to convert a signal charge transferred from a charge coupled device into a voltage;
- a resetting unit to eject a signal charge accumulated in said floating diffusion region in response to a reset pulse;
- a first source follower to current-amplify said voltage;
- a second source follower in which a load is changed in response to said reset pulse and which is used to current-amplify an output voltage of said first source follower;
- a voltage amplifier to voltage-amplify said output voltage of said first follower and to feed said amplified voltage to said second source follower;
- a delay circuit to delay said reset pulse by a fixed time interval and to feed said reset pulse to said second source follower;
- wherein said second source follower is made up of a driving transistor, first load transistor, and second load transistor which function only when said reset pulse or delayed reset pulse is applied; and
- wherein said first and second load transistors are enhancement type n-channel Metal Oxide Silicon transistors doped with p-type impurity wherein said first and second load transistors have same gate widths and operate at same threshold voltages and wherein a supply voltage is applied to a gate of said first load transistor and said reset pulse or said delayed reset pulse having approximately a same amplitude as that of said supply voltage is applied to a gate of said second load transistor.

29. The charge transfer device according to claim 28, wherein said delay circuit is made up of a resistor and a capacitor.

30. The charge transfer device according to claim 28, wherein said delay circuit is made up of inverters connected in series in a plurality of stages.

31. The charge transfer device according to claim 28, wherein delay time set by said delay circuit is determined based on delay time in said first source follower and on delay time in said resetting unit.

32. The charge transfer device according to claim 28, wherein said delay time set by said delay circuit is determined based on delay time in said first source follower, delay time in said resetting unit, and delay time in said voltage amplifier.

33. The charge transfer device according to claim 28, wherein said second load transistor is an enhancement type n-channel Metal Oxide Silicon transistor doped with p-type impurity.

34. The charge transfer device according to claim 28, wherein a gate width of said second load transistor is designed so that a reset field-through noise occurring based on operations of said resetting unit is reduced to a predetermined amount.

* * * * *

UNITED STATES PATENT AND TRADEMARK OFFICE
CERTIFICATE OF CORRECTION

PATENT NO. : 6,515,318 B2
DATED : February 4, 2003
INVENTOR(S) : Tsunai

It is certified that error appears in the above-identified patent and that said Letters Patent is hereby corrected as shown below:

Column 13,
Line 7, "or" should be -- on --.

Signed and Sealed this

Fourteenth Day of September, 2004

JON W. DUDAS
*Director of the United States Patent and Trademark Office*